(12) United States Patent
Uchida (10) Patent No.: US 10,991,328 B2
(45) Date of Patent: Apr. 27, 2021

(54) DISPLAY DEVICE, DISPLAY CONTROL METHOD, AND STORAGE MEDIUM

(71) Applicant: CASIO COMPUTER CO., LTD., Tokyo (JP)

(72) Inventor: Shuhei Uchida, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/718,764

(22) Filed: Dec. 18, 2019

(65) Prior Publication Data

US 2020/0202805 A1 Jun. 25, 2020

(30) Foreign Application Priority Data

Dec. 19, 2018 (JP) .............................. JP2018-237200

(51) Int. Cl.
*G09G 3/36* (2006.01)
*G02F 1/133* (2006.01)
*G09G 5/02* (2006.01)

(52) U.S. Cl.
CPC ........... *G09G 3/3648* (2013.01); *G02F 1/133* (2013.01); *G09G 5/02* (2013.01); *G09G 2320/0666* (2013.01); *G09G 2330/021* (2013.01)

(58) Field of Classification Search
CPC .............................................. G09G 2330/021
See application file for complete search history.

(56) References Cited

U.S. PATENT DOCUMENTS

2018/0275739 A1    9/2018  Minami et al.
2018/0373078 A1*  12/2018  Mizuno ............... G02F 1/13306

FOREIGN PATENT DOCUMENTS

| CN | 108369793 A | 8/2018 |
| JP | 2003-035900 A | 2/2003 |
| JP | 2003-152889 A | 5/2003 |
| JP | 2018-180316 A | 11/2018 |

OTHER PUBLICATIONS

Extended European Search Report dated May 20, 2020 received in European Patent Application No. EP 19214820.3.

* cited by examiner

*Primary Examiner* — Gustavo Polo
(74) *Attorney, Agent, or Firm* — Scully Scott Murphy & Presser (57) ABSTRACT

A display device includes: a first display, a second display stacked on a visible side of the first display and having power consumption lower than that of the first display, a first processor controls the first display, and a second processor controls the first display and the second display and having power consumption lower than that of the first processor. In a state in which operation of the first processor is halted, the second processor causes the second display to display second information and simultaneously causes the first display to display first information having a lighter processing load than information that the first processor causes to be displayed by the first display.

13 Claims, 4 Drawing Sheets

DISPLAY DEVICE, DISPLAY CONTROL METHOD, AND STORAGE MEDIUM

CROSS-REFERENCE TO RELATED APPLICATION

This application claims the benefit of Japanese Patent Application No. 2018-237200, filed on Dec. 19, 2018, the entire disclosure of which is incorporated by reference herein.

FIELD

This application relates to a display device, a display control method, and a storage medium.

BACKGROUND

In order to display a greater amount of information on a small-sized terminal such as a cellphone terminal, technology exists heretofore that vertically stacks, and switches between, a color liquid crystal panel capable of color display and a black-and-white liquid crystal panel having lower power consumption than the color crystal panel (see for example, Unexamined Japanese Patent Application Kokai Publication No. 2003-35900).

SUMMARY

In order to achieve the aforementioned objective, a display device according to an embodiment of the present disclosure includes: first display; a second display stacked on a visible side of the first display and having power consumption lower than that of the first display; a first processor controls the first display; and a second processor controls the first display and the second display and having power consumption lower than that of the first processor. In a state in which operation of the first processor is halted, the second processor causes the second display to display second information and simultaneously causes the first display to display first information having a lighter processing load than information that the first processor causes to be displayed by the first display.

BRIEF DESCRIPTION OF THE DRAWINGS

A more complete understanding of this application can be obtained when the following detailed description is considered in conjunction with the following drawings, in which.

DETAILED DESCRIPTION

Embodiments are described below with reference to drawings.

Figure 1:
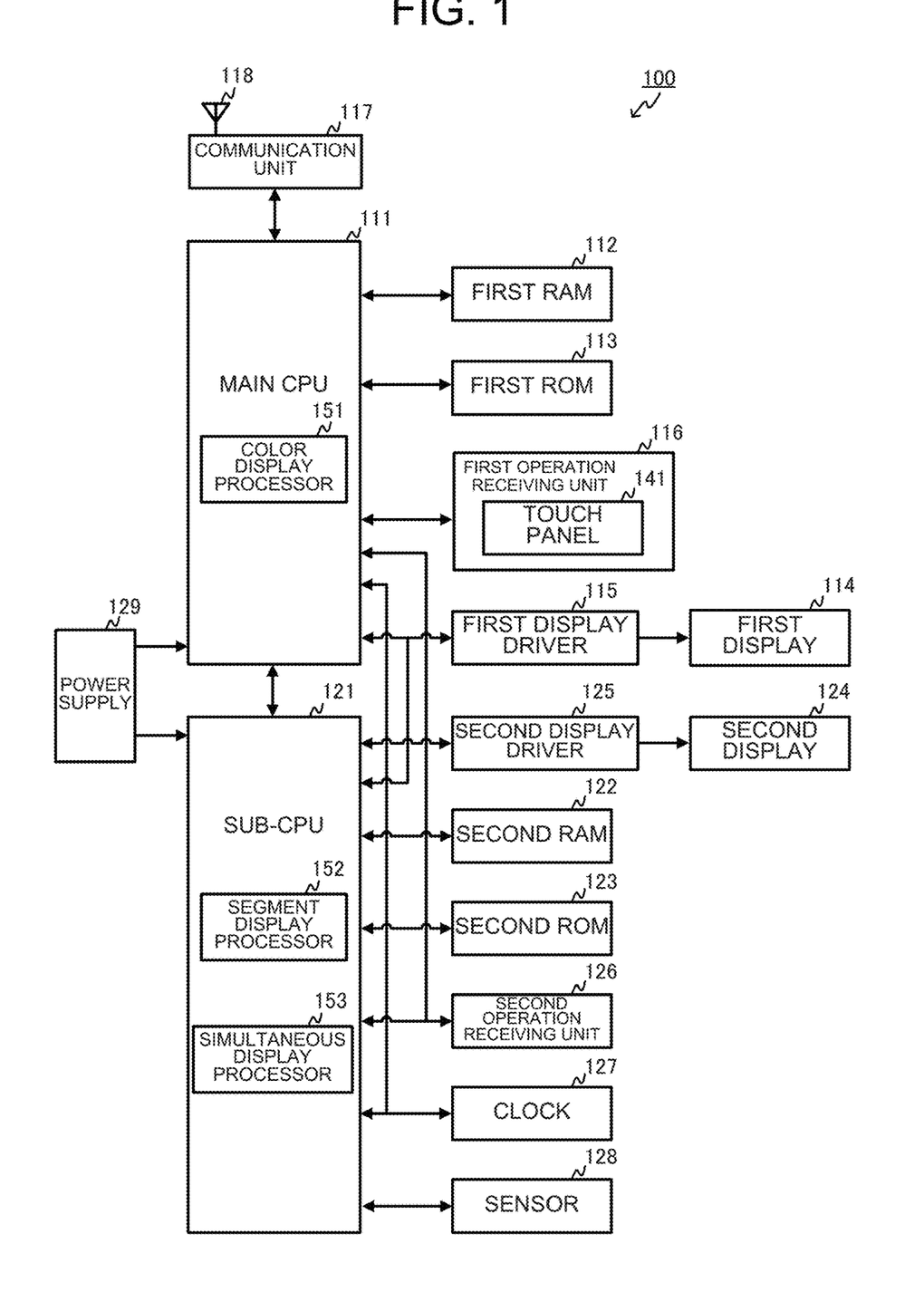
FIG. 1 is a block diagram illustrating an example configuration of a display device according to an embodiment.

FIG. 1 is a block diagram illustrating an example configuration of a display device 100 according to an embodiment. In the present embodiment, the display device 100 is described as a smart watch that is wearable on a wrist of a user. However, the display device 100 is not limited to being the smart watch, but rather may be any electronic device equipped with a display function, such as a cellular phone, a smart phone, a personal computer (PC), or a personal digital assistant (PDA).

Firstly, hardware configuration of the display device 100 according to the present embodiment is described. As illustrated in FIG. 1, the display device 100 is equipped with a main central processing unit (main CPU) 111, a first random access memory (first RAM) 112, a first read only memory (first ROM) 113, a first display 114, a first display driver 115, a first operation receiving unit 116, a communication unit 117, an antenna 118, a sub-CPU 121, a second RAM 122, a second ROM 123, a second display 124, second display driver 125, a second operation receiving unit 126, a clock 127, a sensor 128, and a power supply 129.

The main CPU 111 is an example of a first processor according to the embodiment, performs various types of calculation processing, and is a processor that performs overall control of the all operations of the display device 100. The first RAM 112 is a volatile memory such as static random access memory (SRAM) or dynamic random access memory (DRAM), that provides a memory space for operations by the main CPU 111 and that stores various types of setting data together with storing temporary data. The first ROM 113 is mask ROM, rewritable non-volatile memory, or the like, and stores control programs and initial setting data. The main CPU 111 reads a control program from the first ROM 113, loads the read program into the first RAM 112, and then performs various types of operation processing such as causing display by the first display 114, calculation control according to various types of functions, or the like.

The first display 114 is equipped with a display screen capable of color display, such as a liquid crystal display (LCD), organo-electro-luminescent (EL) display, or the like. The first display driver 115, on the basis of a control signal from the main CPU 111 or the sub-CPU 121, generates data for display by the first display 114 and outputs such generated data to the first display 114. In the present embodiment, the first display 114 displays various types of information such as a background image, time information, sensor information, sent-received messages, or the like.

The first operation receiving unit 116 is equipped with a device such as a key, a button, a microphone, or a touch panel, receives an operation input, and outputs to the main CPU 111 a signal in accordance with the operation input. In the present embodiment, the first operation receiving unit 116 is arranged by stacking on the display screen of the first display 114 a touch panel 141 with the below-described second display 124 therebetween. The touch panel 141 detects a touch position and/or a touch state in accordance with a touch operation of the user touching the touch panel 141, and outputs to the main CPU 111 an operation signal in accordance with the detected touch position and/or touch state.

The communication unit 117 includes a wireless communication module for a wireless local area network (LAN) and/or short-distance wireless communication such as Bluetooth, and performs wireless communication with an external electronic device via the antenna 118.

The sub-CPU 121 is an example of a second processor according to the embodiment, and is a processor that controls display on the second display 124. Although having a processing capacity lower than that of the main CPU 111, the sub-CPU 121 can operation at lower power consumption than the main CPU 111. The second RAM 122 is volatile memory such as SRAM and/or DRAM, provides a memory space for operation of the sub-CPU 121, and stores temporary data as well as various types of setting data. The second ROM 123 is mask ROM and/or read-writable non-volatile memory, and stores control programs and/or initial setting data. The sub-CPU 121 reads the control programs from the second ROM 123, loads such control programs into the second RAM 122, and performs various types of processing such as causing display by the second display 124 and/or calculation control processing according to various types of functions.

The second display 124, for example, is a polymer network (PN) liquid crystal display configured to be entirely or partially transparent to light, for example, and is stacked on a front surface of the first display 114. When a voltage is not applied, liquid crystal molecules align in a disorderly manner, and the second display 124 becomes a white display due to the liquid crystal layer scattering incident light from the exterior. Moreover, upon application of a certain voltage, the second display 124 becomes capable of allowing recognition of the display of the first display 114 through the second display 124 due to the second display 124 entering a light-transmittable state in which the disorderly aligned liquid crystal molecules become aligned perpendicular to the display surface. The second display driver 125 generates data for display on the second display 124 based on a control signal from the sub-CPU 121, and outputs the generated data to the second display 124. In the present embodiment, the second display 124, as described below, displays second information such as information acquired from the sensor 128, time information, or the like.

Figure 2:
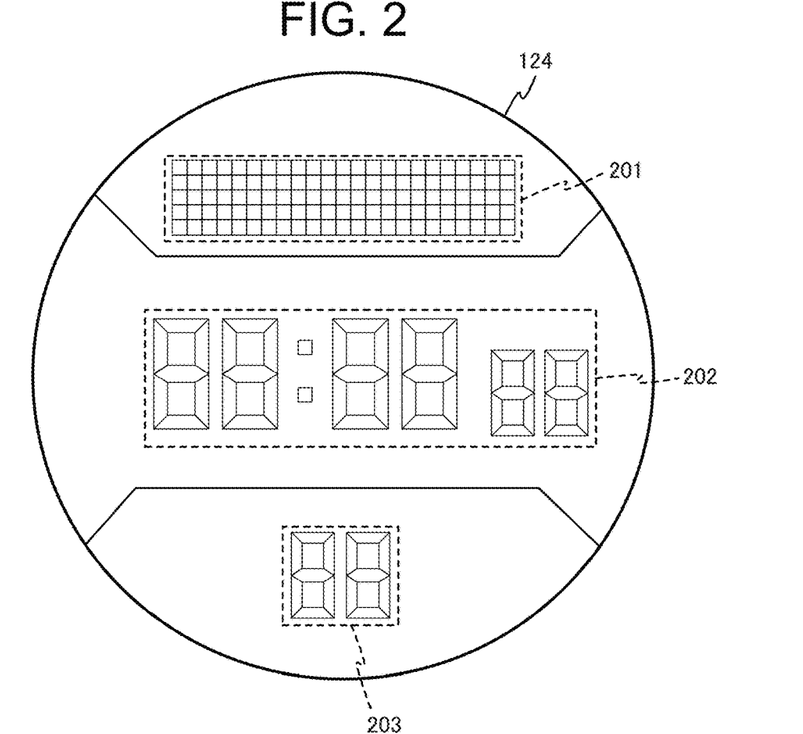
FIG. 2 illustrates a screen configuration of a second display according to the embodiment.

Screen configuration of the second display 124 according to the present embodiment is described with reference to FIG. 2. As illustrated in FIG. 2, the second display 124 includes a dot matrix display region 201, a first segment display region 202, and a second segment display region 203. The dot matrix display region 201 is a region for display of characters, graphics, or the like using vertically and horizontally arranged square-shaped pixels. Text indicating the day of the week and/or a number indicating the day of the month, for example, is displayed in the dot matrix display region 201. The first segment display region 202 and the second segment display region 203 are regions for the display of numbers by seven-segment type display formed from bar-shaped segments arranged in a figure-eight pattern. The first segment display region 202, for example, displays numbers indicating the hour, minute, and second. A number indicating remaining battery charge (%), for example, is displayed in the second segment display region 203.

In this manner, the screen of the second display 124 according to the present embodiment includes the dot matrix display region 201 that has a lower pixel count, that is, dot count, than the first display 114, and the first segment display region 202 and the second segment display region 203 that display numbers in seven segments, and thus the amount of displayable information is restricted in comparison to the first display 114, and although the screen display is simple, the screen is capable of display using low power consumption.

The second operation receiving unit 126 is equipped with keys and/or buttons, for example, receives an operation input from the user, and outputs to the main CPU 111 or the sub-CPU 121 a signal corresponding to the operation input as an input signal.

The clock 127 includes components such as an oscillator circuit, a divider circuit, a clock circuit, or the like, and measures the present time.

The sensor 128 includes, for example, various types of sensors such as a pulse rate sensor, a geomagnetic sensor, an acceleration sensor, a gyro sensor, a luminosity sensor, or the like, or a GPS receiver module as a position sensor that receives a transmission radio wave from a global positioning system (GPS) satellite and acquires time information and/or positional information by processing the received transmission radio wave. The sensor 128 outputs to the sub-CPU 121 a signal indicating the measured data.

The power supply 129 is equipped with a battery and supplies power for operation of the display device 100 to various components at the operational voltage of the components. The utilized battery of the power supply 129, for example, is a rechargeable battery such as a lithium ion battery. Further, a circuit is provided for measuring remaining battery charge of the power supply 129, and a signal indicating the measured remaining battery charge is output to the sub-CPU 121.

Figure 3:
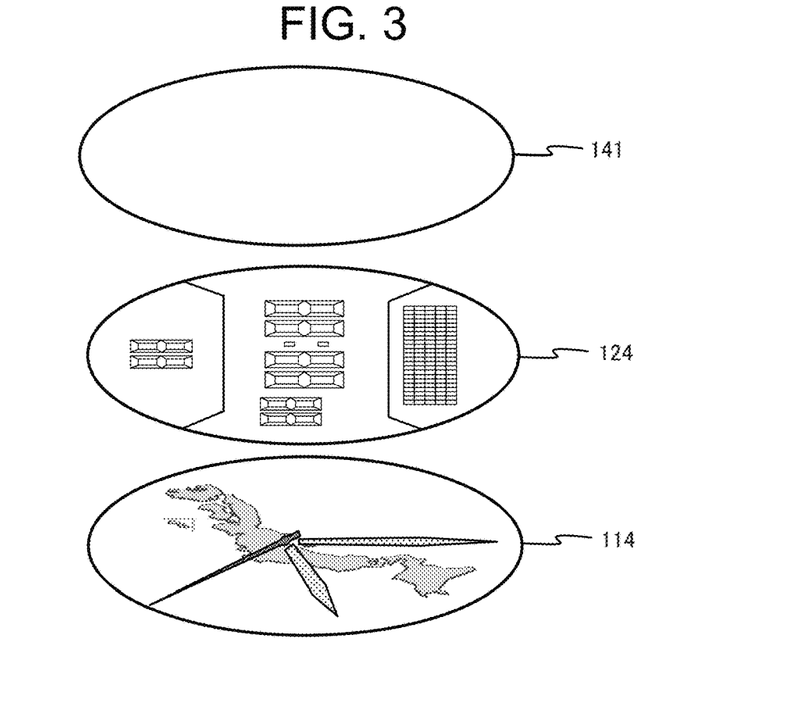
FIG. 3 is a drawing for description of disposal of a touch panel according to the embodiment as a first display, the second display, and a first operation receiving unit.

Arrangement of the first display 114 and the second display 124 of the present embodiment are described next. FIG. 3 is a drawing for explanation of arraignment, in the present embodiment, of the first display 114, the second display 124, and the touch panel 141 as the first operation receiving unit 116. As illustrated in FIG. 3, in the display device 100, the touch panel 141, the second display 124, and the first display 114 are stacked, in order, from the upper side (visible side) downward. Therefore, when the second display 124 is set to the light-transmittable state by application of a certain voltage, the display of the first display 114 is visible to the user through the second display 124.

Functional configuration of the main CPU 111 and the sub-CPU 121 of the display device 100 according to the present embodiment is described next. As illustrated in FIG. 1, in the present embodiment, the main CPU 111 functions as a color display processor 151, and the sub-CPU 121 functions as a segment display processor 152 and a simultaneous display processor 153.

The main CPU 111, as the color display processor 151, cause the display of color information by the first display 114 by control of the first display driver 115 in the color display mode. Here, the color display mode is an example of a first display mode according to the embodiment, and is a mode in which, by the sub-CPU 121 controlling in the light-transmittable state of the second display 124 by application of a certain voltage to the second display 124, color information displayed by the first display 114 is visible to the user through the second display 124.

Figure 4A:
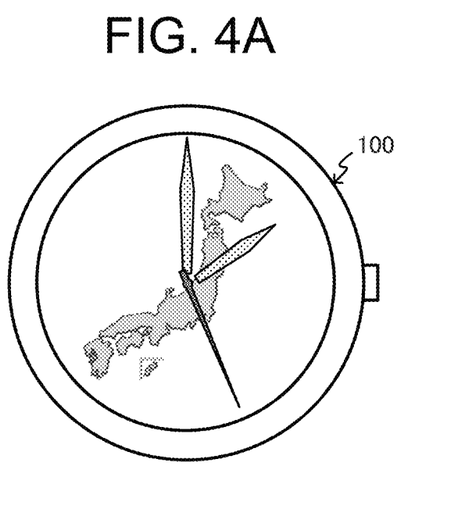
FIG. 4A illustrates an example display occurring in a color display mode of the display device according to the embodiment.

FIG. 4A illustrates an example display occurring in the color display mode of the display device 100 according to the present embodiment. In the example illustrated in FIG. 4A, the main CPU 111 causes the first display 114 to display as color information an image indicating a background image and/or present time, and the color information is visible through the second display 124 that is controlled in the transmissive state. In the color display mode, the main CPU 111 receives an operation input by the user from the touch panel 141, and causes the first display 114 to display various types of information in accordance with the operation input.

The sub-CPU 121, as the segment display processor 152, cause display of second information by the second display 124 in the segment display mode by controlling the second display driver 125. The term "segment display mode" refers to an example of the second display mode according to the embodiment and is a mode in which the sub-CPU 121 causes the second information to be displayed by the second display 124 in a state in which operation of the main CPU 111 is halted. In the segment display mode, power is turned OFF to the main CPU 111 and the first display 114, and thus the first display 114 display is black. On the basis of the output signal from the clock 127 and/or the sensor 128, the sub-CPU 121 acquires the present time and/or sensor information and causes display thereof by the second display 124 as the second information.

Figure 4B:
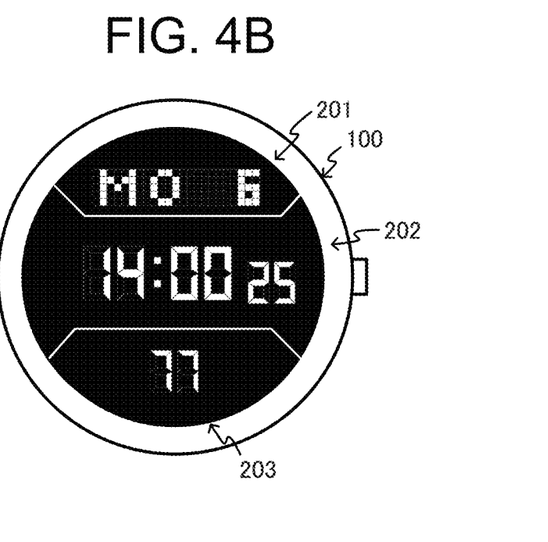
FIG. 4B illustrates an example display occurring in a segment display mode of the display device according to the embodiment.

FIG. 4B illustrates an example display occurring in the segment display mode of the display device 100 according to the present embodiment. In the example illustrated in FIG. 4B, the sub-CPU 121 causes, as display of the second information, display of each of text "MO" indicating the day of the week and the number "6" indicating the calendar day in the dot matrix display region 201 of the second display 124, numbers "14:00 25" indicating the present time, minute, and second in the first segment display region 202, and a number "77" indicating the remaining battery charge in the second segment display region 203. In the segment display mode, due to turning OFF of power to the main CPU 111 and the touch panel 141, an operation input to the touch panel 141 is not receivable.

In the simultaneous display mode that is an example of a third display mode according to the embodiment, the sub-CPU 121, as the simultaneous display processor 153, causes the display of below-described first information by the first display 114 and causes display of second information by the second display 124, by controlling the first display driver 115 and the second display driver 125. In the simultaneous display mode, similarly to the segment display mode, power to the main CPU 111 is turned OFF, and operation thereof halts. On the basis of an output signal from the clock 127 and/or the sensor 128, the sub-CPU 121 acquires the present time and/or the sensor information, controls the first display driver 115 and the second display driver 125, and thus causes display of the first information by the first display 114 and display of the second information by the second display 124.

Figure 4C:
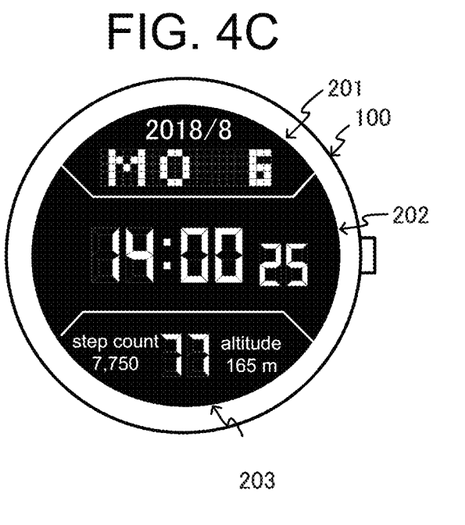
FIG. 4C illustrates an example display occurring in a simultaneous display mode of the display device according to the embodiment.

FIG. 4C illustrates an example display in the simultaneous display mode of the display device 100 according to the present embodiment. In the example illustrated in FIG. 4C, similarly to the example display illustrated in FIG. 4B, the sub-CPU 121 causes display of the second information in each of the dot matrix display region 201, the first segment display region 202, and the second segment display region 203 of the second display 124. Further, the sub-CPU 121 controls the first display driver 115 to display numbers "2018/8" indicating the year and month in the region of the first display 114 above the dot matrix display region 201, and to, as the first information in the region to the right and left of the second segment display region 203, display by the first display 114 the information "step count 7,750" indicating a step count and the information "altitude 165 m" indicating altitude. Further, the first information displayed by the first display 114 in the simultaneous display mode, in comparison to the color information displayed in the color display mode, is information that has a lower update frequency, information that has a smaller display size, information that uses fewer colors, or is information displayed monochromatically, that is to say, is information having a processing load that is low enough for processing by the sub-CPU 121.

Figure 4D:
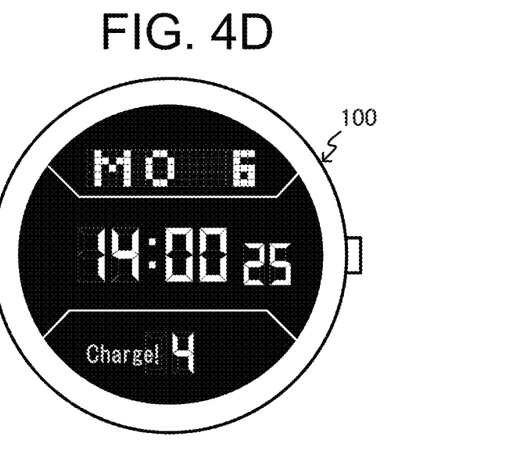
FIG. 4D illustrates another example of the simultaneous display mode of the display device according to the embodiment.

FIG. 4D illustrates a separate example display occurring in the simultaneous display mode of the display device 100 according to the present embodiment. In the example illustrated in FIG. 4D, the sub-CPU 121, similarly to the example display illustrated in FIG. 4B, causes display of the second information in each of the dot matrix display region 201, the first segment display region 202, and the second segment display region 203 of the second display 124. The sub-CPU 121 further controls the first display driver 115 cause the first display 114 to display as the first information a message "Charge!" for encouraging charging of the battery in a region to the left of the second segment display region 203.

In the present embodiment, the display device 100 can switch between the aforementioned three display modes of the color display mode, the segment display mode, and the simultaneous display mode, in accordance with selection input by the user or in accordance with time passed since transition to a particular mode. For example, in the initial state immediately after turning ON of power to the display device 100, the main CPU 111 of the display device 100 causes display on the first display 114 in the color display mode. Then when the user selects the segment display mode via the first operation receiving unit 116, the main CPU 111 halts operation due to turning OFF of power, and the sub-CPU 121 starts the display by the second display 124 in the segment display mode. Upon receiving of a certain operation from the user via the second operation receiving unit 126 while the second information is displayed by the second display 124, the sub-CPU 121 further transitions to the simultaneous display mode and causes display of the first information by the first display 114. Then upon passage of a prescribed period, such as 10 seconds, after causing the display of the first information by the first display 114, the sub-CPU 121 ends the display of the first information by the first display 114 and returns to the segment display mode. Upon the user selecting the color display mode via the second operation receiving unit 126, power is turned ON to the main CPU 111, and the main CPU 111 starts display by the first display 114 in the color display mode.

Figure 5:
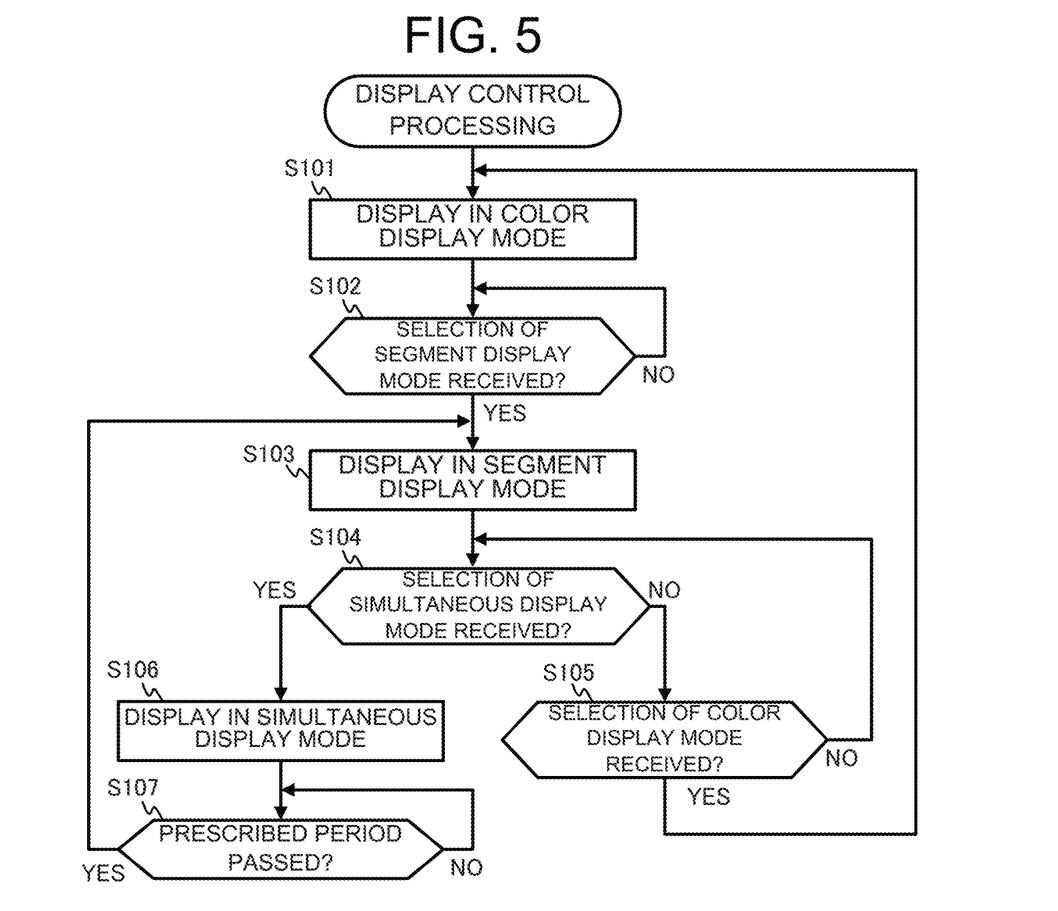
FIG. 5 is a flowchart of display control processing executed by the display device according to the embodiment.

Operation of the display device 100 in accordance with the present embodiment is described next. FIG. 5 is a flowchart illustrating an example of display control processing of the display device 100 in the present embodiment. The main CPU 111 of the display device 100 starts the display control processing illustrated in FIG. 5 due to, for example, turning ON of power to the display device 100.

Firstly, the main CPU 111 performs display by the first display 114 in the color display mode (step S101).

Next, the main CPU 111 determines whether a selection of the segment display mode is received from the user via the first operation receiving unit 116 (step S102). Upon the main CPU 111 determining that the selection of the segment display mode by the user via the first operation receiving unit 116 is not received (NO in step S102), the display in the color display mode continues.

Upon determination by the main CPU 111 that selection of the segment display mode by the user is received via the first operation receiving unit 116 (YES in step S102), the main CPU 111 turns OFF power to the first display 114, and the sub-CPU 121 performs display by the second display 124 in the segment display mode (step S103).

Thereafter, the sub-CPU 121 determines whether the selection of the simultaneous display mode by the user via the second operation receiving unit 126 is received (step S104). Upon determination that selection of the simultaneous display mode is not received from the user via the second operation receiving unit 126 (NO in step S104), the sub-CPU 121 determines whether selection of the color display mode is received via the second operation receiving unit 126 (step S105).

Upon determination that selection of the color display mode by the user via the second operation receiving unit 126 is not received (NO in step S105), processing by the sub-CPU 121 returns to step S104 and continues the display in the segment display mode. Further, upon determination that the selection of the color display mode by the user via the second operation receiving unit 126 is received (YES in step S105), processing by the sub-CPU 121 returns to step S101 and starts display in the color display mode.

Upon the sub-CPU 121 determining that selection of the simultaneous display mode by the user is received via the second operation receiving unit 126 (YES in step S104), the sub-CPU 121 turns ON power to the first display 114 and performs display by the first display 114 and the second display 124 in the simultaneous display mode (step S106).

Thereafter, the sub-CPU 121 determines whether a prescribed period, such as 10 seconds, is passed after the start of the display in the simultaneous display mode during step S106 (step S107). Upon determination that the prescribed period is not passed (NO in step S107), processing by the sub-CPU 121 returns to step S107, and display in the simultaneous display mode continues. Upon determination that the prescribed period is passed (YES in step S107), processing by the sub-CPU 121 returns to step S103, and display in the segment display mode starts.

The main CPU 111 and the sub-CPU 121 repeatedly execute the aforementioned processing until power is turned OFF to the display device 100.

For the display device 100 according to the present embodiment in the above-described manner, in the state in which operation of the main CPU 111 is halted, the sub-CPU 121 causes the display of the first information by the first display 114, and causes display of the second information by the second display 124. Due to display via the first display 114 by the sub-CPU 121 that has lower power consumption than the main CPU 111, a greater amount of information can be displayed while suppressing power consumption.

Moreover, in the display device 100 according to the present embodiment, the sub-CPU 121 causes the display of the first information in a region of the first display 114 that at least partially does not overlap the region where the second information is displayed, that is to say, does not overlap the region above the dot matrix display region 201 and/or the region to the right or left of the second segment display region 203. Due to such operation, the display device 100 effectively uses a region in which the second information of the second display 124 is not displayed, and can display a greater amount of information.

In the display device 100 according to the present embodiment, upon receiving of a certain operation from the user via the second operation receiving unit 126 while the second information is being displayed by the second display 124, the sub-CPU 121 causes display of the first information by the first display 114. Then upon passage of a prescribed period after display of the first information by the first display 114, the sub-CPU 121 ends the display of the first information by the first display 114. Due to such operation, the period of the display device 100 causing the display of the first information by the first display 114 that has higher power consumption than the second display is limited, and thus overall power consumption of the display device 100 can be further suppressed.

The display device 100 of the present embodiment can switch between: the color display mode in which the sub-CPU 121 controls the second display 124 to be in the light-transmittable state such that the color information is visibly displayed through the second display 124 by the first display 114 due to operation of the main CPU 111; the segment display mode in which the sub-CPU 121 causes the display of the second information by the second display 124 in the state in which operation of the main CPU 111 is halted; and the simultaneous display mode in which, in the state in which the operation of the main CPU 111 is halted, the sub-CPU 121 causes display of the first information by the first display 114 and causes display of the second information by the second display 124. Due to such operation, the display device 100 can switch between display modes in accordance with information desired by the user, and can also suppress power consumption.

The present description is not limited to the aforementioned embodiment, and various types of modifications are possible.

For example, in the aforementioned embodiment, an example is described in which the display device 100 switches from the segment display mode to the simultaneous display mode due to receiving of the user selection of the simultaneous display mode. However, the trigger for switching to the simultaneous display mode is not limited to that of this example. For example, the display device 100 may switch to the simultaneous display mode on the basis of data measured by the sensor 128 and/or a remaining battery charge measured by the power supply 129. For example, the remaining battery charge measured by the power supply 129 drops below a prescribed threshold, the display device 100 may switch to the simultaneous display mode and display by the first display the first information as illustrated in FIG. 4D. Moreover, when the first information is displayed by the first display 114 in the simultaneous display mode, the display may be in monochrome or color. For example, in the example display illustrated in FIG. 4D, the first information may be displayed in a state that is easily understood by the user by causing the first display 114 to display in red color the first information as a message that reads "Charge!" to prompt the user to charge the battery.

Moreover, in the aforementioned embodiment, an example is described in which the display device 100 switches to the segment display mode after passage of the prescribed period after switching from the segment display mode to the simultaneous display mode. However, after the switch from the segment display mode to the simultaneous display mode, the display device 100 may continue the simultaneous display mode until receiving selection of the segment display mode by the user. Moreover, although an example is described in the aforementioned embodiment in which the display device 100 switches between the three display modes that are the color display mode, the segment display mode, and the simultaneous display mode, the display device 100 may be configured to switch between the two display modes that are the color display mode and the simultaneous display mode.

Moreover, in the aforementioned embodiment, an example is described in which the display device 100 causes display of, as the first information in the simultaneous display mode, the year and month, the step count, the altitude, or the message prompting charging of the battery. However, the first information displayed in the simultaneous display mode is not limited to that of this example, and data measured by various types of sensors included in the sensor 128 may be displayed as the first information in the simultaneous display mode. Moreover, the first information displayed in the simultaneous display mode may be selectable by the user.

In the aforementioned embodiment, the display device 100 may allow the sub-CPU 121 to operate the simultaneous display mode in the state in which the main CPU 111 is operating. For example, in a state in which the main CPU 111 is operating although various types of processing such as calculation processing for various other types of functions is performed without display by the first display 114, the sub-CPU 121 may cause display of the first information by the first display 114, and may cause display of the second information by the second display 124.

Moreover, an example is described in the aforementioned embodiment in which the main CPU 111 and the sub-CPU 121 perform various types of control operations such as display control processing. However, the control operations are not limited to software control by the CPU. A hardware configuration may be used in which a part or all of the control operations are performed by use of circuitry such as dedicated logic circuits.

In the aforementioned embodiment, an example is cited in which the first ROM 113 and the second ROM 123 are formed by non-volatile memory such as flash memory as a computer-readable medium for storage of programs according to the display control processing of the present embodiment. However, the computer-readable medium may be a portable recording medium such as a hard disc drive (HDD), a compact disc read only memory (CD-ROM), a digital versatile disc (DVD), or the like. Moreover, a carrier wave may be used in the present description as the medium for supplying data of programs according to the present disclosure via communication circuits.

In addition, specific components of the configurations illustrated in the above embodiments, the control procedures, the example displays, or the like may be modified appropriately within a scope that does not depart from the gist of the present description.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display device comprising:
   a first display;
   a second display stacked on a visible side of the first display and having power consumption lower than that of the first display;
   a first processor configured to control the first display to display information; and
   a second processor configured to control the first display and the second display and having power consumption lower than that of the first processor,
   wherein in a state in which the first processor does not cause the first display to display the information, the second processor is configured to cause the second display to display second information and to simultaneously cause the first display to display first information having a lighter processing load than the information that the first processor causes to be displayed by the first display.

2. The display device according to claim 1,
   wherein in a state in which the first processor is operating, the second processor is configured to cause the first display to display the first information and cause the second display to display the second information.

3. The display device according to claim 1,
   wherein the second processor is configured to cause the first display to display the first information in a region of the first display that at least partially does not overlap a region of the second display where the second information is displayed.

4. The display device according to claim 1,
   wherein an update frequency of the first information is lower than an update frequency of the information that the first processor causes to be displayed by the first display.

5. The display device according to claim 1,
   wherein the first information has a display size smaller than the information that the first processor causes to be displayed by the first display.

6. The display device according to claim 1,
   wherein the first information has fewer colors than the information that the first processor causes to be displayed by the first display.

7. The display device according to claim 1,
   wherein upon receiving of a certain operation from a user during display of the second information by the second display, the second processor is configured to:
   cause the first display to display the first information; and
   after a prescribed period is passed after the displaying of the first information by the first display, stop causing the first display to display the first information.

8. The display device according to claim 1,
   wherein in a first display mode, the second processor is configured to control the second display to be in a light-transmittable state such that the information that the first processor causes to be displayed by the first display is visible through the second display,
   wherein in a second display mode, the second processor is configured to cause the second information to be displayed by the second display in the state in which the first processor does not cause the first display to display the information,
   wherein in a third display mode in which, in the state in which the first processor does not cause the first display to display the information, the second processor is configured to cause the second display to display the second information and simultaneously cause the first display to display the first information, and
   wherein the display device is configured to switch between the first display mode, the second display mode and the third display mode.

9. The display device according to claim 1,
   wherein the second display comprises a segment display region configured to display the second information.

10. The display device according to claim 1,
wherein the second display comprises a dot matrix display configured to display the second information, the dot matrix display having lower resolution than the first display.

11. The display device according to claim 1, further comprising:
a clock configured to measure present time,
wherein the second processor is configured to control the second display to display, as the second information, the present time measured by the clock.

12. A display control method for controlling a display device comprising:
a first display;
a second display stacked on a visible side of the first display and having power consumption lower than that of the first display;
a first processor configured to control the first display to display information; and
a second processor configured to control the first display and the second display and having power consumption lower than that of the first processor, the display control method comprising:
in a state in which the first processor does not cause the first display to display the information, causing, by the second processor, the second display to display second information and simultaneously causing the first display to display first information having a lighter processing load than the information that the first processor causes to be displayed by the first display.

13. A non-transitory computer-readable storage medium storing a program for controlling a display device comprising:
a first display;
a second display stacked on a visible side of the first display and having power consumption lower than that of the first display;
a first processor configured to control the first display to display information; and
a second processor configured to control the first display and the second display and having power consumption lower than that of the first processor, the program causing the second processor to:
in a state in which the first processor does not cause the first display to display the information, causing the second display to display second information and simultaneously causing the first display to display first information having a lighter processing load than the information that the first processor causes to be displayed by the first display.

* * * * *